(12) United States Patent
Dos Reis et al.

(10) Patent No.: US 11,144,577 B2
(45) Date of Patent: Oct. 12, 2021

(54) METHOD FOR EFFICIENT MAPPING UPDATES BETWEEN DYNAMIC KNOWLEDGE ORGANIZATION SYSTEMS

(71) Applicant: Luxembourg Institute Of Science And Technology (LIST), Esch-sur-Alzette (LU)

(72) Inventors: Julio Cesar Dos Reis, Sao Paulo (BR); Cedric Pruski, Metz (FR); Marcos Renato Da Silveira, Liege (BE)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 275 days.

(21) Appl. No.: 16/325,206

(22) PCT Filed: Jun. 28, 2017

(86) PCT No.: PCT/EP2017/066010
§ 371 (c)(1),
(2) Date: Feb. 13, 2019

(87) PCT Pub. No.: WO2018/033286
PCT Pub. Date: Feb. 22, 2018

(65) Prior Publication Data
US 2019/0188214 A1  Jun. 20, 2019

(30) Foreign Application Priority Data

Aug. 17, 2016  (LU) ............................................ 93179

(51) Int. Cl.
*G06F 16/20* (2019.01)
*G06F 16/28* (2019.01)
(Continued)

(52) U.S. Cl.
CPC ........ *G06F 16/288* (2019.01); *G06F 16/2365* (2019.01); *G06F 16/367* (2019.01)

(58) Field of Classification Search
None
See application file for complete search history.

(56) References Cited

U.S. PATENT DOCUMENTS 6,108,670 A * 8/2000 Weida .................... G06N 5/022

OTHER PUBLICATIONS

Julio Cesar Dos Reis et al. "mapping adaptation actions for the automatic reconciliation of dynamic ontologies", Jan. 1, 2013 (Jan. 1, 2013), pp. 599-608, XP055346939, New York, New York, USA (Year: 2013).*

(Continued)

*Primary Examiner* — Belix M Ortiz Ditren
(74) *Attorney, Agent, or Firm* — Sandberg Phoenix & von Gontard, P.C.

(57) ABSTRACT

A method for storing and updating data relating to a first dynamic Knowledge Organization System, and for storing and updating the mapping of its concepts to the concepts of a second Knowledge Organization System. The methods enables a reduction the computational burden involved in updating the mapping if Knowledge represented in the first KOS evolves, while at the same time ensuring a high level of accuracy of the mapping between both KOSs. This allows for more efficient use of the knowledge represented on aggregate by multiple KOSs, for example in the context of automated systems or artificial intelligence agents.

10 Claims, 3 Drawing Sheets

(51) Int. Cl.
G06F 16/36 (2019.01)
G06F 16/23 (2019.01)

(56) References Cited

OTHER PUBLICATIONS

International Search Report for corresponding PCT/EP2017/066010 dated Jul. 26, 2017.

Julio Cesar Dos Reis et al: "Mapping adaptation actions for the automatic reconciliation of dynamic ontologies", Proceedings of the 22nd ACM International Conference on Conference on Information & Knowledge Management, CIKM '13, Jan. 1, 2013 (Jan. 1, 2013), pp. 599-608, New York, New York USA.

Dinh Duy et al: "Identifying Change Patterns of Concept Attributes in Ontology Evolution", May 25, 2014 (May 25, 2014), Network and Parallel Computing; [Lecture Notes in Computer Science; Lect.Notes Computer], Springer International Publishing, Cham, pp. 768-783.

* cited by examiner

METHOD FOR EFFICIENT MAPPING UPDATES BETWEEN DYNAMIC KNOWLEDGE ORGANIZATION SYSTEMS

The present invention is the US national stage under 35 U.S.C. § 371 of International Application No. PCT/EP2017/066010, which was filed on Jun. 28, 2017, and which claims the priority of application LU 93179 filed on Aug. 17, 2016, the content of which (text, drawings and claims) are incorporated here by reference in its entirety.

FIELD

The present application lies in the field of data structures for efficient big data management. In particular, the application deals with efficient and quick updates between dynamic knowledge organization systems.

BACKGROUND

Knowledge Organization Systems, KOS, are data structures that organize data in a specific domain, which may for example be a technical domain or a life science domain, according to hierarchically organized concepts having specific attributes. Typically, such data may be structured in a hierarchical graph or tree and stored in a database. A parent node of the tree represents a more generic concept than its child nodes, which therefore represent a more specific concept in the knowledge domain.

In information science, an ontology is a specific example of a KOS, which formally names and defines types, attributes and interrelationships of the entities that really exist for a particular domain of discourse or knowledge domain in a formal way. Often a single concept may have a different naming depending on the knowledge domain that is considered. It is also common for a concept in one knowledge domain to have no direct equivalent in another knowledge domain, whereas similar, i.e. more generic or more specific concepts do exist in another knowledge domain. Mappings between ontologies representing concepts of different knowledge domains allow capturing the relationships of concepts across ontologies, which allows for a richer and more precise semantic interpretation of expressions describing concepts. Such mappings are also typically stored in database structures. The hierarchical data structure of an ontology, and mappings relating the ontology to other ontologies, allows for example for artificial intelligence, AI, systems to infer the precise meaning of a concept whose label is provided through any form of user input, being vocal or written, including its conceptual context.

Ontologies offer the means to make the semantics of data explicit by annotating available data with concept labels that make it possible for computers to understand the annotated data. This is the case, for instance, in the health sector where patient data stored in electronic health records, EHR, are associated with concept codes or terms borrowed from standard controlled terminologies such as the International Classification of Diseases, ICD, or SNOMED CT, facilitating data exchange between different systems. However, the dynamic nature of domain knowledge forces revision of the content of ontologies. Lacking such revision, a mismatch between the definition of concepts and the annotations persists, thus preventing any efficient and/or automatic exploitation of the data.

The dynamic evolution of a KOS, i.e. changes in a concept or an attribute, therefore potentially invalidates an existing mapping between the evolving KOS and other ones. As a result, the automatic and accurate use of KOS and mappings by AI agents or other software applications is impaired or at least rendered inefficient.

Known solutions comprise maintaining accurate mappings manually, which is tedious, time consuming and error-prone. In particular, in KOS's spanning very large datasets, manual maintenance of mappings is not a realistic option. Known automated algorithms for maintaining mappings rely on complete recomputations of mappings between every concept in the first and second KOS involved in the mapping. As the computational task is extremely time consuming, such maintenance is not applied regularly, which increases the timespan during which the mapping between KOS's is inaccurate. Moreover, known solutions are not capable of coping with all types of concept evolutions (addition, deletion, generalization, specification, etc.).

SUMMARY

It is an objective of the present invention to alleviate at least some of the problems arising in the prior art.

In accordance with a first aspect of the invention, a method for updating relationship data describing mappings between concepts of a first and a second large scale dynamic Knowledge Organization System, KOS, wherein each KOS organizes data describing concepts and their relative attributes in a hierarchical data structure. The method comprises the following steps:

a) for each concept in the first KOS, storing in a common dedicated database record, data describing the concept, its attributes, and data describing its sub-, super and sibling-concepts in the hierarchical structure;

b) identifying at time t, using data processing means, a concept in the first KOS, which maps to a concept in the second KOS, and which has evolved compared to an earlier time t−1, and evaluate if the identified concept evolution affects its mapping;

c) retrieving, using data processing means, data identifying the evolved concept's sub-, super- and sibling concepts from the corresponding database record;

d) in accordance with the identified concept evolution, modifying, using data processing means, only the pieces of relationship data that describe the respective mappings between the evolved concept as well as its sub-, super- and sibling concepts in the first KOS, and the corresponding concepts in the second KOS, and storing the resulting updated relationship data in a memory element.

The first and second KOS can be stored in database stored in a memory element. In various instances, the first and second KOS can be stored in distinct databases. Further the relationship data can be stored in a database. The processing means can in various instances have read/write access to the memory element storing the database, which can be physically collocated with a computing device comprising the processing means, or which can be located at a physically remote location, the processing means having access to the remote memory element by means of a data communication channel and data transmission/reception means.

The first and second KOS can comprise ontology data defining a formal naming and definition of concepts or types, having properties or attributes and interrelationships of the entities that really or fundamentally exist in a particular domain.

Each concept of each KOS can in various instances comprise at least one attribute that comprises data characterizing the concept.

In various instances, the identification step b) can comprise the step of identifying a concept as an evolved concept, only if between time t−1 and time t, data describing at least one attribute of the concept has changed, the attribute affecting the relationship data between the first and second KOS.

Data describing at least one attribute of a concept, the attribute affecting the relationship data between the first and second KOS, can in various instances be determined using processing means by identifying semantically similar attributes of related concepts in the first and second KOS respectively. A related concept can in various instances be a sub-, super- or sibling concepts of the concept to which the attribute belongs.

In various instances, the modification step d) can comprise relating the evolved concept in the first KOS to a concept in the second KOS, to which it did not map prior to its evolution, or modifying an existing mapping to a concept in the second KOS.

The modification step d) can in various instances comprise the step of interpreting the evolution of the concept from time t−1 to time t, the interpretation comprising retrieving data describing the evolved concept of the first KOS, using data processing means, from a data repository.

An evolution of a KOS can comprise introduction of a new concept, rendering an existing concept obsolete, rendering an existing concept more specific or rendering an existing concept less specific.

In various instances the interpretation can comprise inferring the semantic relationship that links the concept before and after evolution, including for example identifying whether by evolving, the concept has become more generic, more specific or remains equivalent.

The data repository can in various instances comprise one or more further Knowledge Organization Systems, KOS.

In various instances, the database record can comprise data pointers to memory locations of a memory element, at which the corresponding concept and/or attribute data are stored.

According to a further aspect of the invention, a computing device comprising a memory element and data processing means is provided. The data processing means have read/write access to at least one database comprising data of a first and second large scale dynamic Knowledge Organization System, KOS, wherein each KOS is organized so that data describing concepts and their relative attributes are stored in a hierarchical data structure, the at least one database further comprising relationship data describing mappings between concepts of the first and second KOS. The data processing means are further configured for:

a) for each concept in the first KOS, storing in a common dedicated database record, data describing the concept, its attributes, and data describing its sub-, super- and sibling concepts in the hierarchical structure;

b) identifying at time t a concept in the first KOS, which maps to a concept in the second KOS, and which has evolved compared to an earlier time t−1, and evaluate if the identified concept evolution affects its mapping;

c) retrieving data identifying the evolved concept's sub-, super- and sibling concepts from the corresponding database record;

d) in accordance with the identified concept evolution, modifying only the pieces of relationship data that describe the respective mappings between the evolved concept as well as its sub-, super- and sibling concepts in the first KOS, and the corresponding concepts in the second KOS, and storing the resulting updated relationship data in a memory element.

According to another aspect of the invention, a computer program is provided. The computer program comprises computer readable code means, which, when run on a computer, causes the computer to carry out the method according to the invention.

In accordance with yet another aspect of the invention, a computer program product is provided, which comprises a computer-readable medium on which the computer program according to the invention is stored.

The features of the present invention allow increasing the efficient use of dynamic knowledge organization systems, in which concepts evolve and get new attributes/meaning over time. The technical exploitation of the surprising discovery, in that only the KOS concepts which lie in the direct neighbourhood (i.e., super- sub- or sibling concepts in the hierarchical data structure) of an evolved/changed KOS concept and their respective mappings to concepts of other KOSs, are effected by the concept's evolution, brings about several technical advantages as compared to state of the art solutions. Indeed, when a concept changes in a first KOS, only those mappings that are hierarchically close to the changed concept, and their respective mappings to corresponding concepts in a second KOS, need to be analysed and updated following the change, in order to maintain a high degree of data integrity between both KOSs. Based on this observation, the invention suggests storing the data that is likely to be affected by a concept change, together in a single database record with the data of the concept. A database structure in which a database record stores the data relating to a given concept together with the data of its sub- super- and sibling concepts is therefore provided, resulting in a radically different data structure as compared to known KOS database structures. If a concept evolves, only a single database record is queried and retrieved. The retrieved record comprises all the data that must potentially be updated in order to maintain an accurate mapping following the concept's evolution. This results in a significant maintenance time reduction as compared to known solutions, which require the recomputation of mappings between all concepts of both KOSs involved in a mapping, following dynamic evolution of one or more concepts.

As the maintenance is performed quicker and using less computing resources, the efficient use of the KOSs by software applications or AI agents is increased, as the "downtime" due to erroneous mappings is reduced.

The automatic detection of concept evolutions in a KOS, and the automatic characterization of the detected changes allows to fully automate the maintenance operation and at same time guaranteeing a high level of data consistency. This is achieved by using a network of existing ontologies for automatically inferring the semantic relationship existing between two concepts (i.e. the concept prior and after its evolution, the concept after evolution and the concept to which the concept prior to the evolution mapped, etc.).

DRAWINGS

Several embodiments of the present invention are illustrated by way of figures, which do not limit the scope of the invention.

DETAILED DESCRIPTION

This section describes the invention in further detail based on example embodiments and on the figures. Unless stated otherwise, features described for a specific embodiment are applicable to, and can be combined with the features of any other embodiments according to the present invention. The embodiments presented herein allow the skilled person to understand and implement the method and device in accordance with the present invention.

1. Exemplary Embodiment

Figure 1:
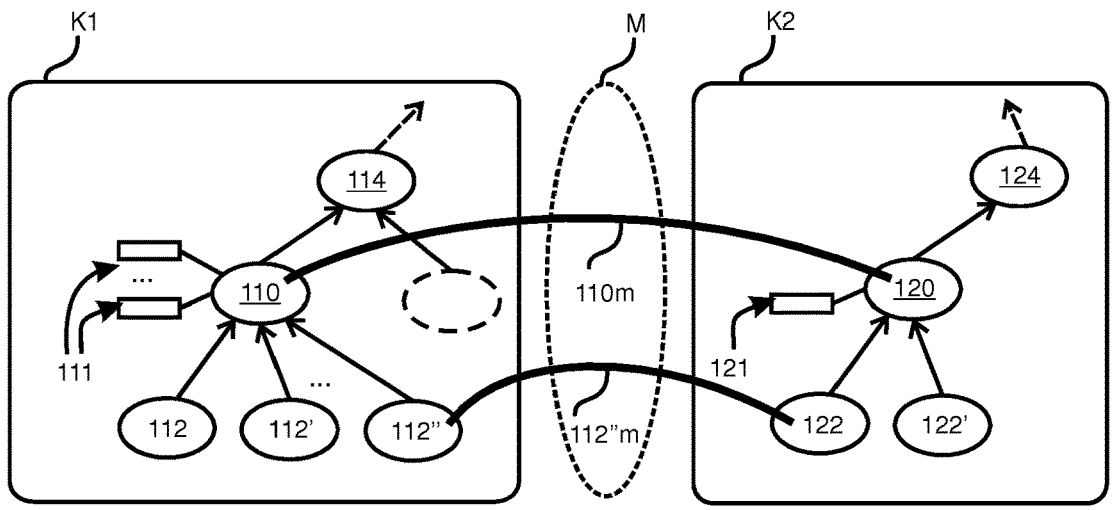
FIG. 1 illustrates two Knowledge Organization Systems and a Mapping between both, in accordance with various embodiments of the invention.

FIG. 1 illustrates the general setting in which the current invention is applied. A first Knowledge Organization System, KOS, K1, organizes data describing a series of concepts and their relative attributes in a hierarchical data structure. As shown, a concept 110 is situated at a given depth in the hierarchical structure. Concept 110 describes more specific data than concept 114, which is concept 110's parent or super-concept. Similarly, sub-concepts 112, 112', and 112" describe data that is more specific than the data described by concept 110. Each concept is characterized by a set of attributes, which are used to provide a more fine grained description of the data represented by this concept. In the example shown, concept 110 is characterized by a series of attributes 111. It is clear that the invention applies to KOS of generic sizes, the shown example being a mere illustration of the way data is represented within a KOS. In a practical application, K1 can for example describe data representing medical conditions, wherein concept 110 can be the name of a particular disease, and attribute 111 can be described a synonymous expression.

In many knowledge areas, different taxonomies are used to describe the same or similar concepts. In the context of KOSs, this gives rise to multiple KOSs, each describing the same or similar data using the respective hierarchical structure induced by the specific taxonomy associated with the KOS. In order to take full advantage of the rich information described by the plurality of KOSs as a whole, it is necessary to map similar concepts in each pair of KOSs by a mapping. The mapping represents relationship data between concepts and/or attributes of the KOSs.

In the example of FIG. 1, K2 is a second KOS. The data represented by K2 at least partially overlaps with the data represented by K1. The concept 120 is situated at a given depth in the hierarchical structure. Concept 120 describes more specific data than concept 124, which is concept 120's parent or super-concept. Similarly, sub-concepts 122 and 112' describe data that is more specific than the data described by concept 120. Each concept is characterized by a set of attributes, which are used to provide a more fine grained description of the data represented by concept. In the example shown, concept 120 is characterized by a series of attributes 121.

The data represented by concept 110 of K1 and concept 120 of K2 is the same, although it can be labelled by a different word, as the data of K1 and K2 are organized according to different taxonomies in the same knowledge field. Concepts 110 of K1 and 120 of K2 are therefore related, as indicated by the mapping line 110$m$. A similar link 112"$m$ is shown between concept 112" of K1 and concept 122 of K2 respectively. The set of all mappings between K1 and K2 is described by M.

As knowledge evolves in time, so does the data described by each KOS. In the example of FIG. 1, an evolution of the knowledge represented by K1 can affect either a concept or an attribute of the hierarchical structure. This can in turn imply that the mapping M is affected. Keeping the mapping updates is crucial for making efficient use of the rich knowledge represented by both K1 and K2. As K1, and hence the mapping M, is dynamic, FIG. 1 illustrates merely an exemplary snapshot at a given time, say t−1.

The inventors have come to the surprising insight that a changed concept in a first KOS K1 potentially only impacts mappings that relate the changed concept, its siblings in KOS K1, its super-concept in K1 and its sub-concepts in K1 to respective concepts in a second KOS K2. Once a changed or evolved concept is identified, select updating of a restricted data set is therefore sufficient for reconciling the mapping M with the evolved data represented by K1. In state of the art solutions, entire mappings M, i.e., the relationship data between all concepts in K1 and all concepts in K2 is recomputed in order to achieve such reconciliation. In a KOS grouping several hundreds of thousands of concepts, this computational task is very time consuming. The method according to the invention is computationally more efficient while achieving a high mapping accuracy of 96% according to experiments conducted on datasets involving about 400'000 mappings between two KOSs.

Figure 2:
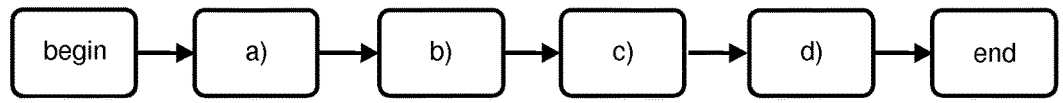
FIG. 2 illustrates the main steps of a method in accordance with various embodiments of the invention.
Figure 3:
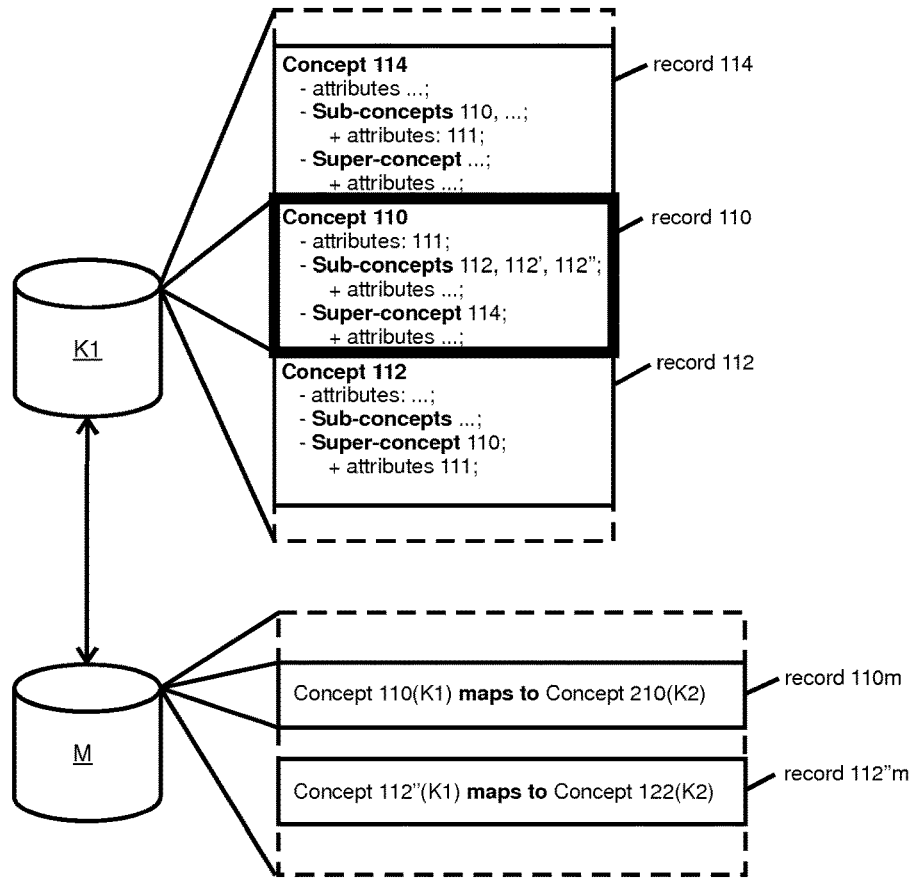
FIG. 3 illustrates the database structures created by a method in accordance with various embodiments of the invention.

The main steps according to an exemplary embodiment of the method according to the invention are illustrated in FIG. 2. At step a), for each concept in a first KOS K1, data describing the concept, its attributes and data describing its sub-, super- and sibling concepts in the hierarchical structure representing the KOS are stored in a common dedicated database record. FIG. 3 shows the resulting database comprising the data of K1 as described in the example of FIG. 1. In the database, the data is structured so that record 110 described the data, i.e. a label, of concept 110 and its attributes 111. In the same database record, all the data describing the sub-concepts 112, 112', and 112", as well as the super-concepts 114 of concept 110 is stored as well. Alternatively, memory pointers to the respective pieces of data are stored in the database record, while the actual data is stored elsewhere non-contiguously.

In a subsequent step b), at a time t, data processing means having read/write access to the database storing the data of K1 identify a concept in the first KOS K1, which maps to a concept in the second KOS K2, and which has changed compared to an earlier time t−1. The data processing means are further configured for evaluating if the so-identified concept affects its mapping to a concept in K2.

Once a concept that has evolved and the evolution of which invalidates the mapping M that was valid at time t−1, i.e., prior to the evolution of the concept, is retained by the algorithm, the processing means retrieve the data corresponding to the evolved concept, it's sub- super- and sibling concepts in K1. Considering concept 110 in FIG. 1 has been retained, and given the data structure created at step a), the requisite data is quickly retrieved by querying record 110 from database K1 as shown in FIG. 3. This corresponds to an embodiment of step c) according to the invention.

The data in record 110 comprises information identifying, with high probability, all concepts of K1 that are susceptible of requiring a mapping update following the evolution of concept 110. The mapping or relationship data for all concepts of K1 is stored in a database M as shown in FIG. 3. Clearly, in accordance with the inventors' findings, only records 110m and record 112"m potentially require updating in order to reconcile their existing mapping with the evolved KOS K1. Indeed, these records describe the mapping that previously linked the now-evolved concept 110 to concept 210 of K2, as well as sub-concept 112' of K1 to concept 122 of K2. In addition, new mappings involving the super- sub- and sibling concepts of concept 110 can be added in the course of updating the relationship data M. This corresponds to the final step d) of the method according to the exemplary embodiment of the invention. Steps c) and d) are performed for each evolved concept that is identified at b).

According to further embodiments of the invention a concept is only identified as having evolved at step b), if at least one attribute of the concept has changed between times t−1 and time 1, and wherein the changed attribute affects the relationship data between the first and second KOS.

The nature of a concept's evolution can be inferred by processing means using a set of existing and trustful Knowledge Organization Systems and their associated mappings. For example, one can consider that concept 110 from KOS K1 has a mapping with concept 120 in K2, and that the evolution of concept 110 into concept 110' impacts the existing mapping. The label or description of concept 110' is searched for in other KOS's from the same knowledge domain but different from the first and second KOS K1 and K2, which are accessible by the processing means, for example using a communication network and appropriate data transmitters/receptors. If the evolved concept 110' is found, the algorithm navigates within the same external KOS to search for concept 120. If concept 120 is found in the same KOS, the semantic relationship between concepts 110' and concept 120 is inferred using the structural properties of the KOS that contains both concepts 110' and 120, in order to adapt the mapping M between KOS K1 and KOS K2. If however concept 120 cannot be found in the same external KOS as 110', the algorithm uses existing mappings to exploit other related KOSs. The relationships from the path that connects concepts 110' and concept 120 are systematically composed to determine which relationship is used to updated the mapping M.

The mapping M comprises further details characterizing the relationship between two mapped concepts from the first and second KOS K1 and K2 respectively. The relationship expressed by the mapping can for example include "equivalence", "more specific", "less specific", "partially matched" or "unrelated", without being limited to these, in order to allow for precise usage of the information comprised in both K1 and K2.

In the following sections 2 and 3, several optional features are disclosed, which indicate how a mapping M can be altered following the detection of a concept evolution, and given the nature of the detected concept evolution. While the nomenclature of sections 2 and 3 can differ from the nomenclature of section 1, the differences are highlighted and clear to the person of average skill in the art.

2. Preliminaries

The definitions presented in this section are used to detail the addressed problem and to describe our approach. The terms Ontology and Knowledge Organization Systems are supposed to be synonymous terms.

An ontology O specifies a conceptualization of a domain in terms of concepts, attributes and relationships. Formally, an ontology O=(C;R;A) consists of a set of concepts C interrelated by directed relationships R. A leaf concept has no sub concept. One concept can have one or more super concepts and/or sibling concepts. Each concept c of C has a unique identifier and is associated with a set of attributes $A(c)=\{a_1; a_2; \ldots\}$ (e.g., label, definition, synonym, etc.). Furthermore, each attribute is defined for a particular objective, e.g., "label" for denoting concept names or "definition" for giving the meaning in the context where the concept is used. Each relationship r of R is typically a triple $(c_1; c_2; t)=r(c_1; c_2)$ where t is the relationship symbol (e.g., "is_a", "part_of", "adviced_by", etc.) used to interconnect both concepts $c_1$ and $c_2$.

The context of a particular concept $c_i$ of O is defined as a set of super concepts, sub concepts and sib (sibling concepts) of $c_i$, as following: (sibling concepts) of $c_i$, as following:

$$CT(c_i) = \sup(c_i) \cup \text{sub}(c_i) \cup \text{sib}(c_i) \quad (1)$$

Where $$\sup(c_i) = \{c_j | c_j \in O, c_i \sqsubset c_j \wedge c_i \neq c_j\}$$

$$\text{sub}(c_i) = \{c_j | c_j \in O, c_j \sqsubset c_i \wedge c_i \neq c_j\}$$

$$\text{sib}(c_i) = \{c_j | c_j \in O, \sup(c_j) = \sup(c_i) \wedge c_i \neq \quad (2)$$

where $c_i \sqsubset c_j$ stands for "$c_i$ is a sub concept of $c_j$". This definition of $CT(c_i)$ is specially designed as the relevant concepts to be taken into account in the settings of this investigation on mapping adaptation.

Given two concepts $c_s$ and $c_t$ in two different ontologies, a mapping $m_{st}$ can be defined as:

$$m_{st} = (c_s, c_t, \text{semType}, \text{conf}, \text{status}) \quad (3)$$

where semType is the semantic relation connecting $c_s$ and $c_t$. In the context of the description of the present embodiment the terms "relation" and "relationship" have different meanings. Where the former belongs to a mapping and the later to an ontology. The following types of semantic relation are considered: unmappable [⊥], equivalent [≡], narrow-to-broad [≤], broad-to-narrow [≥] and overlapped [≈]. For example, concepts can be equivalent (e.g., "head"≡"head"), one concept can be less or more general than the other (e.g., "thumb"≤"finger") or concepts can be somehow semantically related (≈). The conf is the semantic similarity between $c_s$ and $c_t$ indicating the confidence of their relation. A status is useful to describe the state of a mapping during the adaptation process.

The ontology change operations, OCC, presented in Table I are considered. They are classified into two main categories: atomic and complex changes. Each operation in the former cannot be divided into smaller operations while each one of the latter is composed of more than two atomic operations. For instance, the operation chgA(c; a; v) is composed of two atomic operations delA(a; c) and addA(a; c).

Figure 4:
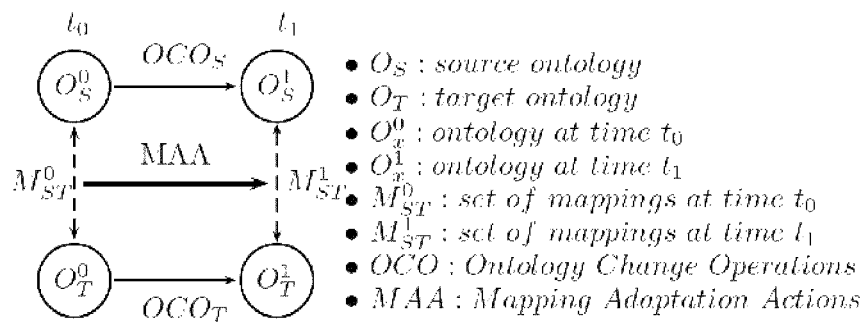
FIG. 4 illustrates the concept of adapting a mapping between two KOS, wherein a first KOS has evolved between times 0 and 1, in accordance with various embodiments of the invention.

The mapping adaptation problem: given two versions of the same source ontology, namely $O^0_S$ at time $t_0$ and $O^1_S$ at time $t_1$, one target ontology $O^0_T$, and an initial set of valid mappings $M^0_{ST}$ between $O^0_S$ and $O^0_T$ at time $t_0$. Suppose that the frequency of new releases of $O_S$ and $O_T$ are different and at time $t_1$ only $O_S$ evolves. Since this evolution is likely to impact on the mappings $M^0_{ST}$, the necessary mapping adaptation actions are applied to $M^0_{ST}$ to guarantee mappings validity, generating $M^1_{ST}$. The validity stands for the logical consistency of the mappings. For instance, mappings are not established with removed concepts. The mapping adaptation problem, therefore, consists of determining how the adaptation of existing mappings is implemented to keep mappings valid and complete according to changes affecting ontology elements. FIG. 4 illustrates the general scenario of this embodiment, where it is considered that $O^0_T$ and $O^1_T$ are the same (i.e., $OCO_T$ is empty).

TABLE I

Ontology change operations

| | Change operation | Description |
|---|---|---|
| Atomic | addC(c) | Addition of a new concept $c \in O_x^1$ |
| | delC(c) | Deletion of an existing concept $c \in O_x^0$ |
| | addA(a, c) | Addition of a new attribute a to a concept $c \in O_x^0$ |
| | delA(a, c) | Deletion of an attribute a from a concept $c \in O_x^0$ |
| | addR(r, $c_1$, $c_2$) | Addition of a new relationship r between two concepts |
| | delR(r, $c_1$, $c_2$) | Deletion of an existing relationship r |
| Complex | chgA(c, a, v) | Change of attribute a in concept c with the new value v |
| | moveC(c, $p_1$, $p_2$) | Moving of concept c (and its subtree) from concept $p_1$ to concept $p_2$ to concept $p_2$ |
| | sub($c_i$, $c_j$) | Replacement of concept $c_i \in O_x^0$ by concept $c_j \in O_x^1$ |
| | merge($C_k$, $c_j$) | Fusion of a set of multiple concepts $C_k \subset O_x^0$ into concept $c_j \in O_x^1$ |
| | split($c_i$, $C_r$) | Split of concept $c_i \in O_x^0$ into a set of resulting concepts $C_r \subset O_x^1$ |
| | toObsolete(c) | Sets status of concept c to obsolete (c is no longer available) |
| | delInnerC($c_i$, $p_j$) | Deletion of concept $c_i$ where $p_j \in \sup(c_i)$ and $\text{sub}(c_i) \neq \emptyset$ from ontology $O_x^0$ |
| | delLeafC($c_i$, $p_j$) | Deletion of leaf concept $c_i$ where $p_j \in \sup(c_i)$ and $\text{sub}(c_i) = \emptyset$ from ontology $O_x^0$ |
| | addInnerC($c_i$, $p_j$) | Addition of a sub concept $c_i$ under the concept $p_j \in \sup(c_i)$ to the ontology $O_x^1$ |
| | addLeafC($c_i$, $p_j$) | Addition of leaf concept $c_i$ where $p_j \in \sup(c_i)$ and $\text{sub}(c_i) = \emptyset$ to the ontology $O_x^1$ |
| | revokeObsolete(c) | Revokes obsolete status of concept c (i.e., c becomes active) |

3. Adapting Mappings According to Ontology Changes

In this section, an approach to adapting semantic mappings is presented, based on different types of ontology changes (Table I). The proposal explores the CT of the mappings' source concept ($CT(c_s)$) for adapting mappings individually. Given a mapping $m_{st}$ associated to a concept $c_s$ affected by changes in the ontology, the challenging issue is to determine an exact and suited action of adaptation to apply to $m_{st}$ in order to keep such mapping up-to-date. To address this challenge, we define and formalize a set of mapping adaptation actions (MAA). We aim at using MAA as pre-defined behaviours of mapping adaptation into algorithms designed to maintain the semantic validity of mappings according to ontology changes. Based on the nature of different types of OCO, we propose algorithms to determine the most adequate MAA for each mapping impacted by an ontology change.

Regarding the adaptation process, the algorithms consider different delimitations of the $CT(c_s)$ according to the types of change. The necessary instances of OCO are identified from one ontology version at time $t_0$ to another at time $t_1$ with a diff computation. It generates a diff, which is a set containing all changes identified. In this non-limiting embodiment, only the changes affecting $O^0_S$, i.e., diff $O_S$ are considered.

An algorithm for identifying the most relevant concept's attributes based on which mappings are defined is disclosed in "Dinh et al., Symposium sur l'Ingénierie de l'Information Médicale, 2013". Given a mapping $m_{st}$ between two concepts $c_s$ of $O_S$ and $c_t$ of $O_T$, the proposed algorithm, namely getTopA($m_{st}$), retrieves the minimum set of source concept's attributes that are the most similar to the ones in the target concept. Attributes are retrieved directly from $c_s$ or its context $CT(c_s)$. For this purpose, known edit-distance similarity measures are used to quantify the semantic relatedness between concepts' attributes. The proposition of selecting top attributes is to identify key elements used to define existing mappings. The top source concept's attributes selected are then exploited for supporting the adaptation of mappings according to ontology changes. The further description of this algorithm is out of the scope of the present invention.

In what follows, the proposed MAA are described in Section 3.1. Afterwards, each section is devoted to a set of OCO. For each section, we propose an algorithm illustrating the adaptation of mappings which explores getTopA, MAA and CT. Particularly, Section 3.2 concerns the adaptation of mappings based on OCO regarding revision of concepts. Section 3.3 accounts for the changes of removal of attributes and concepts, and Section 3.4 presents the approach to tackling the addition of attributes and concepts.

3.1 Mapping Adaptation Actions

Five distinct actions that represent different possibilities for adapting mappings are disclosed: remove, addition, move, derivation and modification of mappings. In the following, each action is formally described. To this end, let $m^0_{st}$ of $M^0_{ST}$ (resp. $m^1_{st}$ of $M^1_{ST}$) be the mapping between two particular concepts $c^0_s$ of $O^0_s$ (resp. $c^1_s$ of $O^1_s$) and $c^0_t$ of $O^0_T$ (resp. $c^1_t$ of $O^1_T$) at time $t_0$ and $t_1$, respectively. Moreover, it is supposed that $c_t$ does not change while the concept $c_s$ evolves from one ontology version to another.

Remove of mapping. This is an atomic action through which a mapping $m^0_{st}$ is deleted from $M^0_{ST}$:

$$\text{remove}M(m_{st}) \rightarrow m_{st}^0 \in M_{ST}^0 \wedge m_{st}^1 \notin M_{ST}^1$$

Addition of mapping. This is an atomic action through which a new mapping $m^1_{st}$ is added to $M^1_{ST}$:

$$\text{addition}M(m_{st}) \rightarrow m_{st}^0 \notin M_{ST}^0 \wedge m_{st}^1 \in M_{ST}^1$$

Move of mapping. This is a composed action in which an existing mapping from $M^0_{ST}$ is reallocated in $M^1_{ST}$, thus the source concept is different. This action is important for adapting mappings by reusing an existing mapping which can be considered invalid in $M^1_{ST}$ due to OCO affecting $c_s$. The mapping is thus adapted considering its $CT(c_s)$.

$$\text{move}M(m_{st}, c_k^1) \rightarrow m_{st}^0 \in M_{ST}^0 \wedge m_{st}^1 \notin M_{ST}^1 \wedge$$

$$(\exists c_k^1 \in CT(c_s^1), m_{kt}^1 \in M_{ST}^1 \wedge \text{sim}(c_s^0, c_k^1) \geq \sigma) \vee$$

$$(\exists c_k^1 \in CT(c_s^1), m_{kt}^1 \in M_{ST}^1 \land sim(c_s^0, c_k^1) \geq \sigma)$$

where $sim(c_i; c_j)$ denotes the similarity between $c_i$ and $c_j$.

Derivation of mapping. This is a composed action which an existing mapping in $M^0_{ST}$ has a modified copy in $M^1_{ST}$ with a different source concept. This action is important for reusing an existing mapping which is still considered valid in $M^1_{ST}$.

$$deriveM(m_{st}, c_k^1) \rightarrow m_{st}^0 \in M_{ST}^0 \land m_{st}^1 \in M_{ST}^1 \land$$

$$(\exists c_k^1 \in CT(c_s^1), m_{kt}^1 \in M_{ST}^1 \land sim(c_s^0, c_k^1) \geq \sigma)$$

Modification of semantic relation. This is a composed action in which the type of the semantic relation of a given mapping is modified. This action is designed for supporting the different types of semantic relations in the mapping adaptation of more expressive semantic mappings than those only considering the type of equivalence relation (=).

$$modSemTypeM(m_{st}, new\_semType_{st}) \rightarrow m_{st}^1 \in M_{ST}^1 \land$$

$$semType_{st}^1 = new\_semType_{st} \land semType_{st}^1 \neq semType_{st}^0$$

$$semType_{st}^1 \in \{\bot, \equiv, \leq, \geq, \approx\}$$

The action for the modification of semantic relation can be applied in conjunction with the actions of move or derivation of mapping. That is when moving/deriving a mapping it is also possible to modify the type of the semantic relation of such mapping.

3.2 Mapping Adaptation According to the Revision of Knowledge in Ontology

The revision of knowledge in ontology is performed by the OCOs chgA(c; a; v); sub($c_i$; $c_j$) merge($C_k$; $c_j$) and split($c_i; C_r$). The main characteristic of these operations is that the involved concepts have some semantic similarity. There is normally a flow of information between concepts belonging to the same complex change that should be explored when adapting mappings. Algorithm 1 presents the proposed strategy for adapting mappings associated to concepts affected by revision change operations. These mappings are adapted considering a delimited context, which is represented by the concepts resulting of the complex change. The resulting set of concepts in these operations is $C_r$ part of $CT(c_i^1)$ such that $c_j$ of $C_r$ (for sub and merge). Algorithm 1 is applied for all instances of revision OCO retrieved from the diff $O^0_s$, $O^1_s$.

Concepts in these operations are the input of Algorithm 1. Indeed, it requires two different set of concepts: $C_k$ part of $O^0_s$ representing the original concepts before evolution and $C_r$ part of $O^1_s$ the resulting concepts in the complex change. The input concepts of these sets are based on the type of OCO as well as the context where mappings are adapted. Mappings associated with concepts affected by chgA operations are not adapted considering other concepts of the context. In the sub and merge operations, an initial concept $c_i$ of $O^0_s$ or a set of concepts $C_k$ part of $O^0_s$, (in case of merge) give place to a concept $c_j$ of $O1_s$. The input of the algorithm by these two types of operations are $c_i$ of $C_k$ for sub and $C_k$ for merge while $c_j$ of $C_r$ is used in both operations, which is the delimited context considered. In the split($c_i; C_r$), an initial concept $c_i$ of $O^0_s$ gives place to a set of (new) related ones resulting in $C_r$ part of $O^1_s$. In this case, the input is slightly different from sub and merge. In split, $c_i$ of $C_k$ with many resulting concepts in $C_r$. Note that $C_r$ part of $CT(c_i)$ representing a delimited context for adapting mappings.

In Algorithm 1 a moveM action is proposed to adapt an impacted mapping to one of the concepts belonging to $C_r$. Particularly, note that in chgA operation a moveM action always considers the same concept identifier in $O^1_s$, while in sub and merge operations if a move of mapping occurs, it is related to the concept Only attributes identified by the algorithm getTopA, representing the most important attributes for a given mapping $m_{ij}$, are concerned in the adaptation process. The result of the Algorithm 1 is that all mappings associated with a concept $c^0_i$ of $C_k$ are moved to a concept $c^1_j$ of $C_r$ (modifying the semantic relation when necessary) or are removed.

According to Algorithm 1, given a concept ($c_i$ in $C_k$) (line 1), it first selects the mappings associated with the concept $c_i$ (line 2). These mappings are adapted individually and for each of them, the algorithm applies the getTopA($m_{ij}$) to identify the relevant attributes of $c_i$. Based on this result, it checks whether the selected attributes are affected by a delA(a) change operation (line 7). In this case, the mapping is assigned as an impacted mapping since a relevant information defining the mapping $m_{ij}$ was removed. If a selected attribute is affected, the mapping must be adapted. We assume that mappings associated with unchanged attribute values remain valid. When a mapping $m_{ij}$ is impacted, Algorithm 1 explores the $C_r$ (line 9) trying to find a candidate concept to perform a move of mapping. In case the concept ci remains at $O^1_s$, i.e., $c_i = c_r$ of $C^1_r$, a mapping $m_{ij}$ can remain attached to this concept whether the most similar attribute value is still found in this concept. However, it is necessary to guarantee that concept $c_r$ remains active in $O^1_s$. Similarly, in merge operation, there are situations where $c^1_j = c^0_k$ of $C_k$ on which a mapping can be moved to the same source concept (i.e., it is still associated with the same source concept identifier at time $t_0$ and $t_1$). Differently, the mapping can be moved to another resulting concept $c_r$, e.g., $c_r$ of sib($c_i$), such that $c_r$ of $C_r$ and $c_r$ different of $c_i$. The most adequate candidate is calculated based on the semantic similarity between the value of affected attributes selected for a mapping and the attributes' value of each concept of the $C_r$ (line 11). The best candidate contains the highest similarity value by sorting S (line 18) which is used to apply a moveM action (line 21). If no candidate is found, that is no concept $c_r$ of $C_r$ contains explicitly a piece of conceptual information the mapping $m_{ij}$ was related to, or if the mapping was assigned to impacted, since a relevant attribute identified was deleted, the algorithm proposes a removeM action (line 26).

Figure 5:
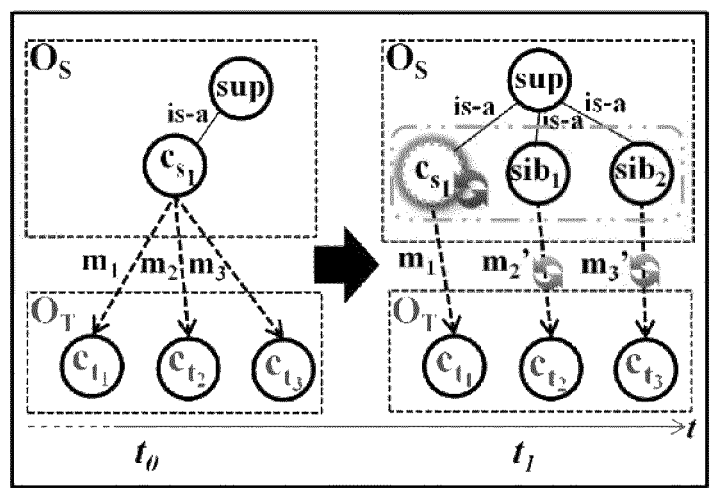
FIG. 5 illustrates an exemplary mapping adaption action in the context of various embodiments of the invention.

FIG. 5 presents the general idea of adapting mappings according to the revision of knowledge in ontologies. Given the evolution of the concept $c_s$, of $O^0_s$, 3 mappings were associated with this concept at time $t_0$. After evolution, there is a split of the concept $c_{s1}$ with 2 sibling concepts on which a mapping $m_1$ remains attached to $c_{s1}$, and 2 other mappings are moved to resulting concepts accordingly.

---

Algorithm 1
Algorithm 1: Adaptation of mappings according to revision of knowledge in ontology Require: $C_k \subset O_S^0$; $C_r \subset O_S^1$
1: for all $c_i \in C_k$ do
2:    $M_{ci} \leftarrow$ getAssociatedMappings($c_i$)
3:    for all $m_{ij} \in M_{C_i}$ do
4:       $S \leftarrow \emptyset$ {Initialize the result set for each mapping to be adapted}
5:       TopA$_{m_{ij}} \leftarrow$ getTopA($m_{ij}$)
6:       for all $a_n \in$ TopA$_{mij}$ do Algorithm 1
Algorithm 1: Adaptation of mappings according to revision
of knowledge in ontology

```
7:      if delA(a_n) ∈ diffo_s then
8:          mapImpacted ← TRUE
9:          for all c_r ∈ C_r do
10:             for all a_r ∈ A(c_r) do
11:                 s_nr ← sim(a_n,a_r);
12:                 S ← S ∪ {(a_r,s_nr,c_r)};
13:             end for
14:         end for
15:     end if
16:     end for
17:     if S ≠ ∅ then
18:         S ← sort(S); {sort results}
19:         c_j ← getFirst(S);
20:         if c_j ∈ O_S^1 then
21:             moveM(m_ij,c_j);
22:             moveSemTypeM(m_ij,semType);
23:         end if
24:     else
25:         if mapImpacted = TRUE ∨ c_j ∉ O_S^1 then
26:             removeM(m_ij);
27:         end if
28:     end if
29: end for
30: end for
```

3.3 Mapping Adaptation According to the Removal of Knowledge in Ontology

The removal of knowledge in ontology includes the OCOs delA(a), delInnerC(c), delLeafC(c) and toObsolete (c). Normally, these operations are less frequent compared to others, since there is a natural tendency to expand the knowledge in the ontology rather than the removal of knowledge. They are usually applied when the knowledge is not up-to-date anymore. Anyway, they can have a great impact on the validity of existing mappings. Algorithm 2 presents the proposed strategy for adapting mappings associated with concepts affected by removal change operations. The input of the algorithm is the set of concepts from the diff $O^0{}_s, O^1{}_s$ where attributes are deleted from concept(s). We assume that the deletion of a concept (or its assignment to obsolete) is the consequence of deleting all attributes (or assigning them to obsolete). Since our approach tackles the ontology mapping adaptation based on the information at the level of attributes, the designed algorithm is suited for handling deletion changes affecting either the entire concept and/or the attributes as a part of the evolving concept. In Algorithm 2 a moveM action is proposed to adapt an impacted mapping $m_{ij}$ to one of the concepts in the $CT(c_i)$, instead of directly removing the mapping. For this purpose, only attributes identified by the algorithm getTopA are considered.

According to Algorithm 2, given a concept ($c_i$) affected by a removal change operation (line 1), it first selects all deleted attributes of concept $c_i$ and the mappings associated with the concept (lines 2-3). For each mapping, it applies the algorithm getTopA to identify the relevant attributes. Then, it checks whether the selected attributes belong to a deleted attribute of the concept (line 8). In case a selected attribute is deleted, the mapping must be adapted. When a mapping is impacted, Algorithm 2 explores the $CT(c_i)$ (line 10) trying to find a candidate to perform a move of the mapping. Different from the revision of knowledge, here there is not a well-delimited context of resulting concepts of a complex change, and thus the algorithm searches for the better candidates among all super, sub and sibling concepts. To this end, it calculates the semantic similarity, among the value of the affected attributes selected for a mapping with the value of attributes of each concept of the $CT(c_i)$ (line 12), in order to select possible candidates for applying a moveM action. The better candidate considered contains the highest similarity value by sorting S (line 19-20). Whether the candidate is found, a move of mapping is applied towards the selected concept of the CT (line 22). If no candidate is found, and the mapping was impacted by a change in at least one attribute of the corresponding source concept among the ones identified as top related attributes for defining the mapping, then the algorithm proposes a removeM action (line 27).

Figure 6:
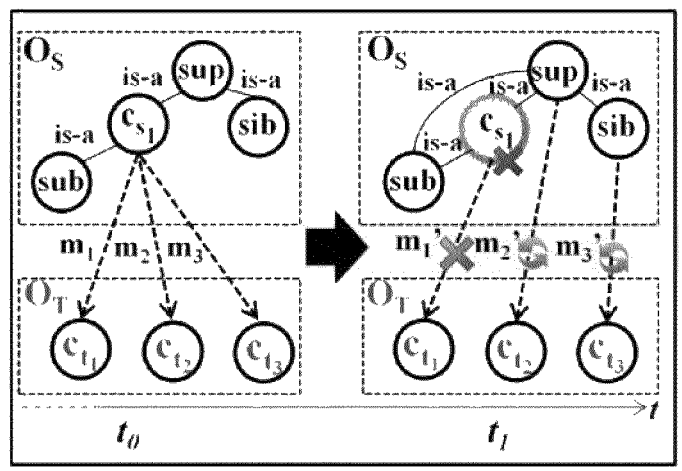
FIG. 6 illustrates an exemplary mapping adaption action in the context of various embodiments of the invention.

FIG. 6 presents the general idea of adapting mappings according to the removal of knowledge in ontologies. Given the evolution of the concept $c_s$, of $O^0{}_s$, 3 mappings were associated with this concept at time $t_0$. After evolution, some attribute belonging to $c_{s1}$ or the whole concept is deleted, and in consequence one mapping is removed while two others are moved to concepts in the context of $c_{s1}$.

Algorithm 2
Algorithm 2: Adaptation of mappings according to the
removal of knowledge in ontology

```
Require: C_rem ⊂ O_S^0; {concepts having at least one
         deleted attribute}
1:  for all c_i ∈ C_rem do
2:      A_remc_i ← getRemovedAttributes(c_i)
3:      M_c_i ← getAssociatedMappings(c_i)
4:      for all m_ij ∈ M_c_i do
5:          S ← ∅; {Initialize the result set for each mapping
                    to be adapted}
6:          TopA_mij ← getTopA(m_ij)
7:          for all a_n ∈ TopA_mij do
8:              if a_n ∈ A_remn_s then
9:                  mapImpacted ← TRUE
10:                 for all c_w ∈ CT(c_i) do
11:                     for all a_w ∈ A(c_w) do
12:                         s_nw ← sim(a_n,a_w);
13:                         S ← S ∪ {(a_w,s_nw,c_w)};
14:                     end for
15:                 end for
16:             end if
17:         end for
18:         if S ≠ ∅ then
19:             S ← sort(S); {sort results}
20:             c_f ← getFirst(S);
21:             if c_f ∈ O_S^1 then
22:                 moveM(m_ij,c_j);
23:                 moveSemTypeM(m_ij, semType);
24:             end if
25:         else
26:             if mapImpacted = TRUE then
27:                 removeM(m_ij);
28:             end if
29:         end if
30:     end for
31: end for
```

3.4 Mapping Adaptation According to the Addition of Knowledge in Ontology

Addition of knowledge in ontology is performed by addA(a), addInnerC(c), addLeafC(c) and revokeObsolete (c). When handling these OCOs, the proposed strategy of mapping adaptation explores the action of derivation of mappings. In order to generate a complete $M^1{}_{ST}$ as a result of mapping adaptation, we aim to reuse mappings associated with concepts, which are in the context of a concept affected by an addition OCO, benefiting of already valid established mappings.

Algorithm 3 presents the approach to adapting mappings by deriving them according to addition OCO. The input of the algorithm is the set of concepts from the diff $O_S$ which are affected by some addition of attribute. Note that when an addition of concept occurs (even inner or a leaf concept) or a concept is assigned to revokeObsolete, we assume that the whole set of attributes are also added. Similarly, as proposed in Algorithm 1 and 2, the approach here also tackles the ontology mapping adaptation based on the information in the level of attributes. Hence, the designed algorithm is suited for handling addition changes affecting the entire concept or in the level of attributes.

The reasoning behind Algorithm 3 is that existing mappings associated with concepts of the context of the new (attribute) concept are considered candidate mappings to be adapted for putting in correspondence the concept affected by an addition OCO. Given a concept ($c_i$) affected by an addition OCO (line 1), Algorithm 3 first verifies if the concept $c_i$ has still no mapping associated. Concepts already mapped are not taken into account. Afterwards, the algorithm selects the added attributes and the concepts of the context of ci (lines 3-4). For each one of these concepts, the associated mappings are selected. For each mapping $m_{kj}$, Algorithm 3 applies the getTopA($m_{kj}$) for identifying the relevant attributes. Based on this result, the algorithm checks whether the set of attributes identified belongs to a deleted attribute of the concept (line 11). If the attribute is not affected by a change, the mapping $m_{kj}$ remains valid. In this case, it can be considered as an adequate candidate for the derivation. Using the method of calculating the semantic similarity between attributes' value, a selection of candidate mappings is performed. The better candidate considered contains the highest similarity value by sorting S (line 21-22). If a candidate mapping is found, a derivationM action is applied to with the selected mapping associated with a concept of the CT (line 23).

Figure 7:
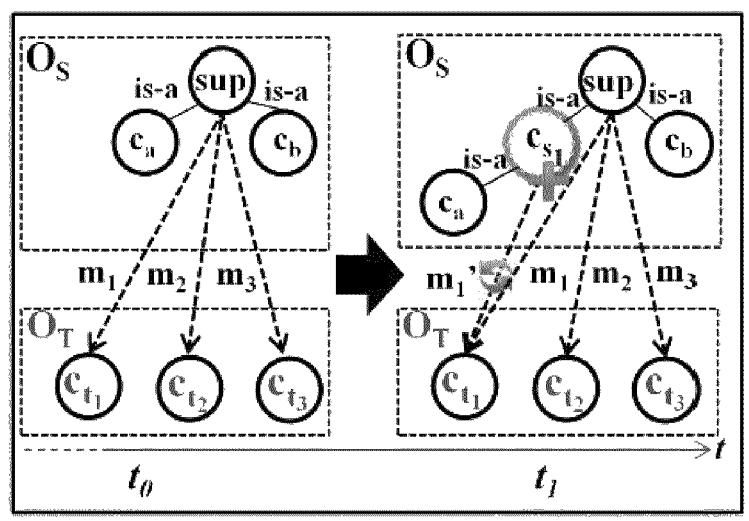
FIG. 7 illustrates an exemplary mapping adaption action in the context of a preferred embodiment of the invention.

FIG. 7 presents the general idea of adapting mappings according to the addition of knowledge in ontologies. Consider the ontology at time $t_0$ including concepts containing mappings ($m_1$, $m_2$, $m_3$). After evolution, a new concept $c_{s1}$ is added and a mapping of a super concept is derived considering cs1 and the same target concept $c_{t1}$ of the original mapping $m_1$.

Algorithm 3
Algorithm 3: Adaptation of mappings according to the addition of knowledge in ontology Require: $C_{add} \subset O_S^1$; {concepts having at least one added attribute and concepts identified as revekeObsolete}
1: for all $c_i \in C_{add}$ do
2:   if hasNoMappingAssociated($c_i$) then
3:     $A_{addc_i} \leftarrow$ getAddedAttributes($c_i$)
4:     $CT_{c_i} \leftarrow CT(c_i)$
5:     for all $c_k \in CT_{c_i}$ do
6:       $M_{c_k} \leftarrow$ getAssociatedMappings($c_i$)
7:       for all $m_{kj} \in M_{c_k}$ do
8:         $S \leftarrow \emptyset$;
9:         TopA$_{m_{kj}} \leftarrow$ getTopA($m_{kj}$)
10:        for all $a_n \in$ TopA$_{m_{kj}}$ do
11:          if delA($a_n$) $\notin$ diffo$_s$ then
12:            for all $A_w \in A_{addc_i}$ do
13:              $s_{nw} \leftarrow$ sim($a_n, a_w$);
14:              $S \leftarrow S \cup \{(s_{nw}, m_{kj})\}$;
15:            end for
16:          end if
17:        end for
18:      end for
19:    end for
20:    if $S \neq \emptyset$ then Algorithm 3
Algorithm 3: Adaptation of mappings according to the addition of knowledge in ontology 21:        $S \leftarrow$ sort(S); {sort results}
22:        $m_f \leftarrow$ getFirst(S);
23:        deriveM($m_f, c_i$);
24:        modSemTypeM($m_f$, semType);
25:      end if
26:    end if
27: end for The mapping adaptation actions outlined here above determine which particular update of the relationship data is applied at step d) of the method according to the invention, once the nature of a concept's evolution has been determined.

It should be understood that the detailed description of specific exemplary embodiments is given by way of illustration only, since various changes and modifications within the scope of the invention will be apparent to those skilled in the art. The scope of protection is defined by the following set of claims.

The invention claimed is:

1. A method for updating relationship data describing mappings between concepts of a first and a second large scale dynamic Knowledge Organization System, KOS, wherein each KOS organizes data describing concepts and their relative attributes in a hierarchical data structure, and wherein the method comprises the following steps:
   a) for each concept in the first KOS, storing in a common dedicated database record, data describing the concept, its attributes, and data describing its sub-, super and sibling-concepts in the hierarchical structure;
   b) identifying at time t, using data processing means, a concept evolution in the first KOS, which maps to a concept in the second KOS, and which has evolved compared to an earlier time t−1, and evaluating if the identified concept evolution affects its associated mapping;
   c) retrieving, using the data processing means, data identifying the evolved concept's sub-, super- and sibling concepts from the corresponding database record;
   d) in accordance with the identified concept evolution, modifying, using the data processing means, only the pieces of relationship data that describe the respective mappings between the evolved concept as well as it's sub-, super- and sibling concepts in the first KOS, and the corresponding concepts in the second KOS, and storing the resulting updated relationship data in a memory element.

2. The method according to claim 1, wherein the identification step b) comprises the step of identifying a concept as an evolved concept, only if between time t−1 and time t, data describing at least one attribute of the concept has changed, the attribute affecting the relationship data between the first and second KOS.

3. The method according to claim 2, wherein data describing at least one attribute of a concept, the attribute affecting the relationship data between the first and second KOS, is determined using the data processing means by identifying semantically similar attributes of related concepts in the first and second KOS respectively.

4. The method according to claim 1 wherein the modification step d) comprises relating the evolved concept in the first KOS to a concept in the second KOS, to which it did not map prior to its evolution, or modifying an existing mapping to a concept in the second KOS.

5. The method according to claim 1, wherein the modification step d) comprises the step of interpreting the evolution of the concept from time t−1 to time t, the interpretation comprising retrieving data describing the evolved concept of the first KOS, using the data processing means, from a data repository.

6. The method according to claim 5, wherein the data repository comprises one or more further Knowledge Organization Systems, KOS.

7. The method according to claim 1, wherein the database record comprises data pointers to memory locations of a memory element, at which the corresponding concept and/or attribute data are stored.

8. A computing device comprising a memory element and data processing means, wherein the data processing means have read/write access to at least one database comprising data of a first and second large scale dynamic Knowledge Organization System, KOS, wherein each KOS is organized so that data describing concepts and their relative attributes are stored in a hierarchical data structure, the at least one database further comprising relationship data describing mappings between concepts of the first and second KOS, wherein the data processing means are structured and operable to:
  a) for each concept in the first KOS, store in a common dedicated database record, data describing the concept, its attributes, and data describing its sub-, super- and sibling concepts in the hierarchical structure;
  b) identify at time t a concept in the first KOS, which maps to a concept in the second KOS, and which has evolved compared to an earlier time t−1, and evaluate if the identified evolved concept affects its mapping;
  c) retrieve data identifying the evolved concept's sub-, super- and sibling concepts from the corresponding database record;
  d) in accordance with the identified evolved concept, modify only the pieces of relationship data that describe the respective mappings between the evolved concept as well as its sub-, super- and sibling concepts in the first KOS, and the corresponding concepts in the second KOS, and storing the resulting updated relationship data in a memory element.

9. A computer program comprising non-transitory computer-readable code means, which, when run on a computer, causes the computer to carry out a method for updating relationship data describing mappings between concepts of a first and a second large scale dynamic Knowledge Organization System, KOS, wherein each KOS organizes data describing concepts and their relative attributes in a hierarchical data structure, and wherein the method comprises the following steps:
  a) for each concept in the first KOS, storing in a common dedicated database record, data describing the concept, its attributes, and data describing its sub-, super and sibling-concepts in the hierarchical structure;
  b) identifying at time t, using data processing means, a concept in the first KOS, which maps to a concept in the second KOS, and which has evolved compared to an earlier time t−1, and evaluating whether the identified evolved concept affects its associated mapping;
  c) retrieving, using the data processing means, data identifying the evolved concept's sub-, super- and sibling concepts from the corresponding database record;
  d) in accordance with the identified evolved concept, modifying, using the data processing means, only the pieces of relationship data that describe the respective mappings between the evolved concept as well as it's sub-, super- and sibling concepts in the first KOS, and the corresponding concepts in the second KOS, and storing the resulting updated relationship data in a memory element.

10. The computer program of claim 9 wherein the computer program is stored on a computer-readable medium of a computer product.

* * * * *